United States Patent
Sausse et al.

(10) Patent No.: US 9,017,017 B2
(45) Date of Patent: Apr. 28, 2015

(54) VARIABLE-VANE ASSEMBLY HAVING FIXED GUIDE PINS FOR UNISON RING

(75) Inventors: Lorrain Sausse, Charmes (FR); Pierre Barthelet, Remiremont (FR); Francis Abel, Dogneville (FR); Olivier Espasa, Dogneville (FR); Mohamed Tahyry, Rambervillers (FR); Emmanuel Bouvier, Epinal (FR)

(73) Assignee: Honeywell Internatonal Inc., Morristown, NJ (US)

( * ) Notice: Subject to any disclaimer, the term of this patent is extended or adjusted under 35 U.S.C. 154(b) by 1477 days.

(21) Appl. No.: 12/421,842

(22) Filed: Apr. 10, 2009

(65) Prior Publication Data

US 2010/0260597 A1    Oct. 14, 2010

(51) Int. Cl.
*F01B 25/02*  (2006.01)
*F01D 17/16*  (2006.01)
*F16B 19/06*  (2006.01)

(52) U.S. Cl.
CPC .......... *F01D 17/165* (2013.01); *F05D 2220/40* (2013.01); *F05D 2230/60* (2013.01); *F05D 2230/64* (2013.01); *F05D 2250/232* (2013.01); *F05D 2250/29* (2013.01); *F05D 2260/37* (2013.01); *F16B 19/06* (2013.01)

(58) Field of Classification Search
USPC .................................................. 415/160, 151
See application file for complete search history.

(56) References Cited

U.S. PATENT DOCUMENTS

| | | | | |
|---|---|---|---|---|
| 3,799,689 | A | * | 3/1974 | Moriguti et al. ................. 415/26 |
| 4,089,249 | A | * | 5/1978 | Binns .............................. 411/510 |
| 4,820,118 | A | * | 4/1989 | Yano et al. ..................... 415/161 |
| 5,092,723 | A | | 3/1992 | Compton et al. |
| 6,699,010 | B2 | * | 3/2004 | Jinnai ............................. 415/164 |
| 2002/0098081 | A1 | * | 7/2002 | Ertl et al. ....................... 415/163 |
| 2007/0068155 | A1 | * | 3/2007 | Hayashi et al. ................. 60/602 |

(Continued)

FOREIGN PATENT DOCUMENTS

| | | | | |
|---|---|---|---|---|
| DE | 102 38 412 | * | 3/2004 | ............. F01D 17/16 |
| DE | 10 2004 023 209 | * | 12/2005 | ............. F01D 17/16 |

(Continued)

OTHER PUBLICATIONS

European Patent Office, Notification of Transmittal of the International Search Report and Written Opinion of the International Searching Authority, or the Declaration, Jul. 24, 2008, all pages.*

(Continued)

*Primary Examiner* — Fernando L Toledo
*Assistant Examiner* — Victoria K Hall
(74) *Attorney, Agent, or Firm* — John C. James (57) ABSTRACT

A variable-vane assembly for a variable nozzle turbine comprises a nozzle ring supporting a plurality of vanes affixed to vane arms that are engaged in recesses in the inner edge of a unison ring. The unison ring is rotatable about the axis of the nozzle ring so as to pivot the vane arms, thereby pivoting the vanes in unison. A plurality of guide pins for the unison ring are inserted into apertures in the nozzle ring and are rigidly affixed therein such that the guide pins are non-rotatably secured to the nozzle ring with a guide portion of each guide pin projecting axially from the face of the nozzle ring. Each guide portion defines a shoulder radially overlapping the inner edge of the unison ring such that the unison ring is restrained by the guide pins against excessive movement in both radial and axial directions.

13 Claims, 11 Drawing Sheets

(56) References Cited

U.S. PATENT DOCUMENTS

| | | | |
|---|---|---|---|
| 2007/0158396 A1 | 7/2007 | Lauk et al. | |
| 2008/0240906 A1* | 10/2008 | Barthelet et al. | 415/148 |
| 2009/0074569 A1* | 3/2009 | Garcin et al. | 415/148 |
| 2010/0202874 A1* | 8/2010 | Hayashi et al. | 415/160 |
| 2011/0138805 A1* | 6/2011 | Barthelet et al. | 60/602 |
| 2011/0171009 A1* | 7/2011 | Espasa et al. | 415/163 |

FOREIGN PATENT DOCUMENTS

| | | | | |
|---|---|---|---|---|
| DE | 10 2004 023 210 | * | 12/2005 | F01D 17/16 |
| DE | 10 2004 023 211 | * | 12/2005 | F01D 17/16 |
| DE | 10 2004 023 282 A1 | | 12/2005 | |
| DE | 10 2004 037 082 A1 | | 3/2006 | |
| EP | 1 156 227 A2 | | 11/2001 | |
| EP | 1 422 384 A1 | | 5/2004 | |
| WO | WO 2008/118833 A1 | | 10/2008 | |

OTHER PUBLICATIONS

European Patent Office, International Search Report, Jul. 22, 2008, all pages.*
European Patent Office, Written Opinion of the International Searching Authority, Jul. 22, 2008, all pages.*
English Translation of Baar, DE 102 38 412.*
English Translation of Magzalci, DE 10 2004 023 209.*
English Translation of Magzalci, DE 10 2004 023 211.*
Communication from the European Patent Office from European Patent Application No. 10158228.6, dated Nov. 14, 2012.
European Search Report from European Patent Application No. 10158228.6, dated Oct. 29, 2012.

* cited by examiner

FIG. 13

VARIABLE-VANE ASSEMBLY HAVING FIXED GUIDE PINS FOR UNISON RING

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

Typically the variable-vane assembly includes a nozzle ring that rotatably supports the vanes adjacent one face of the nozzle ring. The vanes have axles that extend through bearing apertures in the nozzle ring, and vane arms are rigidly affixed to the ends of the axles projecting beyond the opposite face of the nozzle ring. Thus the vanes can be pivoted about the axes defined by the axles by pivoting the vane arms so as to change the setting angle of the vanes. In order to pivot the vanes in unison, an actuator ring or "unison ring" is disposed adjacent the opposite face of the nozzle ring and includes recesses in its radially inner edge for receiving free ends of the vane arms. Accordingly, rotation of the unison ring about the axis of the nozzle ring causes the vane arms to pivot and thus the vanes to change setting angle.

The variable-vane assembly thus is relatively complicated and presents a challenge in terms of assembly of the turbocharger. There is also a challenge in terms of how the unison ring is supported in the assembly such that it is restrained against excessive radial and axial movement while being free to rotate for adjusting the vane setting angle. Various schemes have been attempted for supporting unison rings, including the use of rotatable guide rollers supported by the nozzle ring. Such guide rollers complicate the assembly of the variable-vane assembly because by their very nature they can easily fall out of or otherwise become separated from the nozzle ring, since typically they fit loosely into apertures in the nozzle ring.

BRIEF SUMMARY OF THE DISCLOSURE

The present disclosure relates to a variable-vane assembly for a variable nozzle turbine such as used in a turbocharger, in which the unison ring is radially and axially located with non-rotating guide pins rigidly secured to the nozzle ring. In one embodiment, the variable-vane assembly comprises a nozzle ring encircling an axis and having an axial thickness defined between opposite first and second faces of the nozzle ring, the nozzle ring having a plurality of circumferentially spaced-apart first apertures each extending axially into the first face and a plurality of circumferentially spaced-apart second apertures that are circumferentially spaced from the first apertures and each of which extends axially from the first face to the second face. The assembly also includes a plurality of vanes each having an axle extending from one end thereof, the axles being received respectively into the second apertures from the second face of the nozzle ring and being rotatable in the second apertures such that the vanes are rotatable about respective axes defined by the axles, a distal end of each axle projecting out from the respective second aperture beyond the first face. A plurality of vane arms are respectively affixed rigidly to the distal ends of the axles, each vane arm having a free end.

The setting angles of the vanes are changed in unison by a unison ring having a radially inner edge defining a plurality of recesses therein for respectively receiving the free ends of the vane arms. The unison ring is positioned coaxially with the nozzle ring, with a face of the unison ring opposing the first face of the nozzle ring. The unison ring is rotatable about the axis of the nozzle ring so as to pivot the vane arms, thereby pivoting the vanes in unison.

One of the nozzle ring and the unison ring defines protrusions extending toward and contacting the other so as axially space the first face of the nozzle ring from the opposing face of the unison ring by a first axial distance The assembly also comprises a plurality of guide pins for the unison ring, the guide pins being located radially inward of the radially inner edge of the unison ring and each being inserted into a respective one of the first apertures in the nozzle ring and being rigidly affixed therein such that the guide pins are non-rotatably secured to the nozzle ring with a guide portion of each guide pin projecting axially from the first face of the nozzle ring. The guide portion of each guide pin has a shank and defines a shoulder that extends to a greater radius (relative to the axis of the guide pin) than the shank. The shoulders of the guide pins are axially spaced from the first face of the nozzle ring by a second axial distance greater than the first axial distance. The shoulders radially overlap the radially inner edge of the unison ring, whereby the protrusions and the shoulders cooperate to constrain axial movement of the unison ring and the shanks constrain radial movement of the unison ring.

The guide pins can be secured to the nozzle ring by being press fit into the first apertures in the nozzle ring, or by any other suitable technique.

In one embodiment, the protrusions are integrally formed on the nozzle ring. The protrusions can comprise bosses formed on the nozzle ring, and each of the bosses can be located adjacent a respective one of the first apertures in which the guide pins are affixed. In accordance with one embodiment, each boss can surround the respective first aperture.

In an alternative embodiment, the protrusions are integrally formed on the unison ring. The unison ring can be formed by a stamping process, and the protrusions can be formed during the stamping process.

An advantage of the use of guide pins in accordance with the present disclosure is that the pins can be of a simple shape that can be manufactured without requiring any machining. For example, the pins can be cold forged to their final shape.

In a further aspect of the present disclosure, vane arms are rigidly affixed to the vane axles by a riveting process. The hole in the vane arm that receives the associate vane axle has a conical knurled portion at an upper side of the hole facing away from the associated vane. The distal end of the axle is upset to generally conform in shape to that of the conical knurled portion, thereby achieving an interlocking between the arm and the axle, both rotationally and along the axis of the axle.

BRIEF DESCRIPTION OF THE SEVERAL VIEWS OF THE DRAWING(S)

Having thus described the present disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
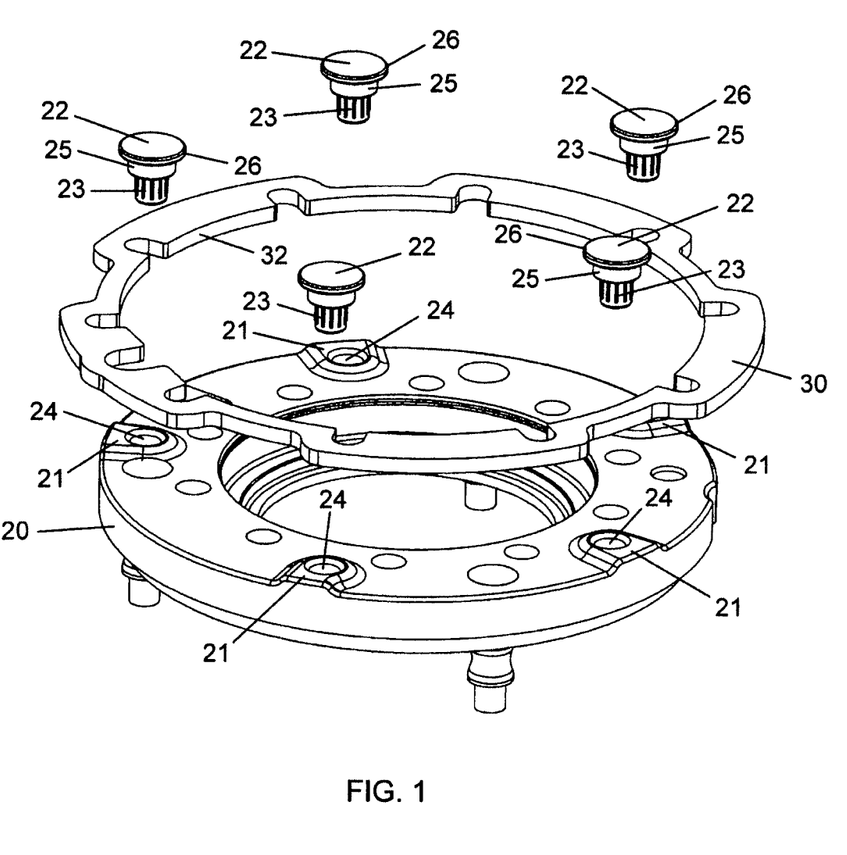
FIG. 1 is an exploded view of a first assembly that includes a nozzle ring having spacers affixed thereto, a unison ring, and guide pins, in accordance with one embodiment of the invention.
Figure 2:
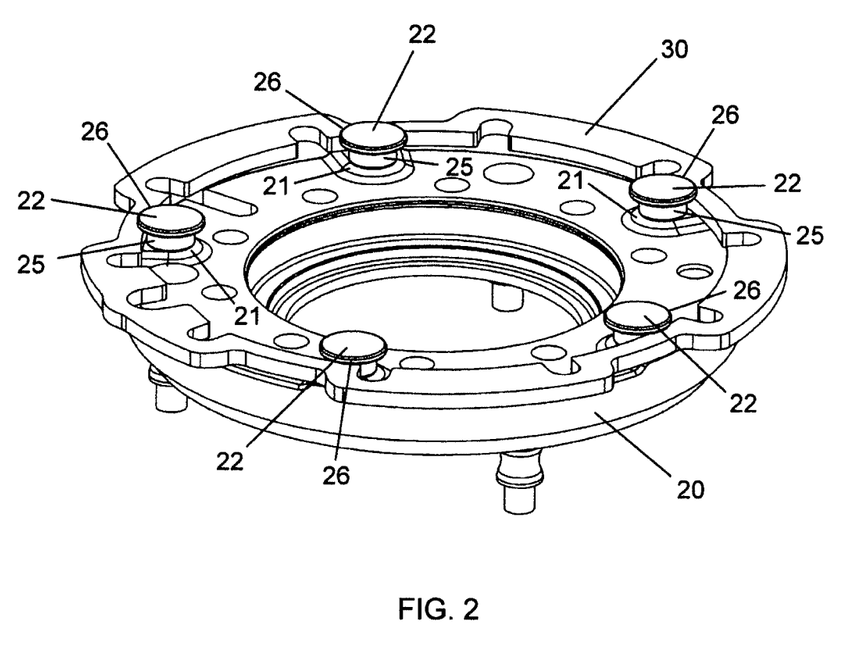
FIG. 2 is a perspective view of the first assembly of FIG. 1, showing the guide pins fixedly secured in corresponding apertures in the first face of the nozzle ring, with the unison ring captured between bosses on the nozzle ring and shoulders on the guide pins.

FIG. 1 shows an exploded view of a first assembly illustrating the initial steps in the operation of assembling a variable nozzle assembly in accordance with one embodiment of the present invention. FIG. 2 shows the first assembly in its assembled condition. The first assembly includes a nozzle ring 20 with a plurality of guide pins 22. The nozzle ring has a plurality of circumferentially spaced first apertures 24 extending into a first face of the nozzle ring for receiving the guide pins. More particularly, each guide pin has a generally cylindrical end portion 23 of relatively small diameter that is sized to fit into a corresponding first aperture 24 with an interference fit. The end portions 23 of the guide pins 22 are press-fit into the first apertures 24, such that guide portions of the guide pins project axially from the first face of the nozzle ring as shown in FIG. 2. The guide portion of each guide pin includes a shank 25 of larger diameter than the end portion 23, and a shoulder 26 of larger diameter than the shank 25. The end of the shank 25 of each guide pin abuts a raised boss 21 on the first face of the nozzle ring when the end portion 23 of the guide pin is fully inserted into a respective first aperture 24. In the illustrated embodiment, there are five guide pins 22 spaced approximately uniformly about the circumference of the nozzle ring, although a different number of guide pins could be used. As illustrated, the bosses 21 are adjacent the first apertures 24, and can (but do not have to) surround each first aperture 24.

The guide pins 22 can be made by a cold-forging process or any other suitable process.

The first assembly also includes a unison ring 30. The unison ring has a radially inner edge 32 that is smaller in diameter than the maximum diameter defined collectively by the shoulders 26 of the guide portions of the guide pins 22. In other words, the shoulders 26 of the guide pins radially overlap the radially inner edge 32 of the unison ring. The largest diameter collectively defined by the shanks 25 of the guide pins is very slightly smaller than or about equal to the diameter of the inner edge 32 of the unison ring 30. Accordingly, the unison ring is located relative to the guide pins such that the inner edge 32 of the unison ring is captive (in the axial direction) between the shoulders 26 of the guide pins and the bosses 21 on the nozzle ring 20. The bosses 21 space the unison ring 30 from the major planar face of the nozzle ring 20 by a first axial distance. The shoulders 26 of the guide pins 22 are axially spaced from the face of the nozzle ring by a second axial distance greater than the first axial distance by an amount sufficient to accommodate the thickness of the unison ring 30 between the shoulders and the bosses, but not so great as to allow any significant axial play of the unison ring, thereby restraining the unison ring against axial movement. At the same time, the shanks 25 of the guide pins 22 restrain the unison ring against radial movement relative to the nozzle ring.

Figure 3:
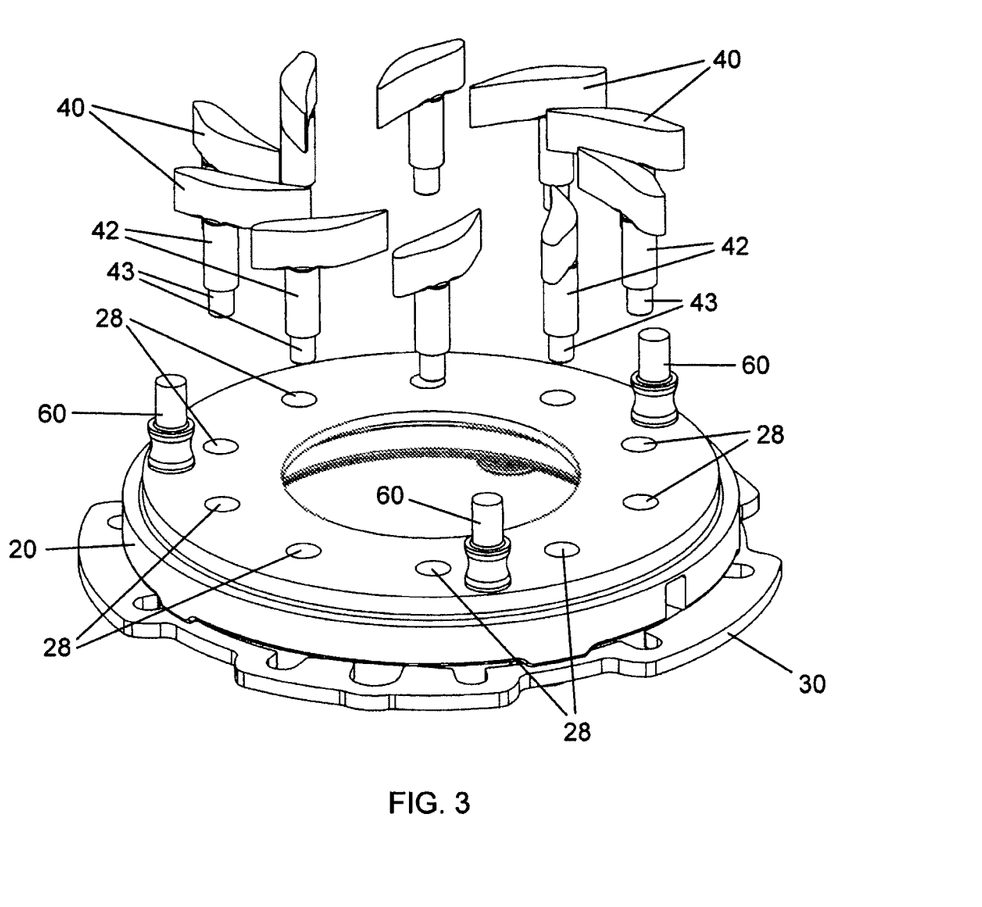
FIG. 3 is an exploded view of a second assembly including the first assembly of FIG. 2 (shown inverted relative to FIG. 2) together with a plurality of vanes.
Figure 4:
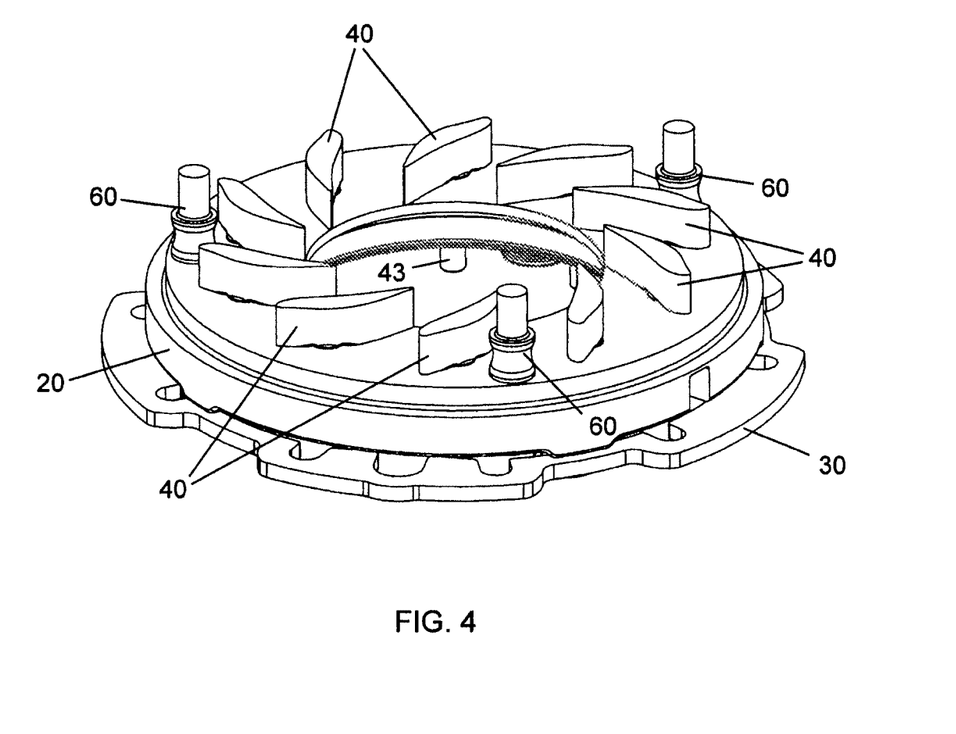
FIG. 4 is a perspective view of the second assembly of FIG. 3.

With reference to FIG. 3, a second assembly is depicted in exploded view. FIG. 4 shows the second assembly in its assembled condition. The second assembly includes the first assembly of FIG. 2 (shown inverted relative to FIG. 2) together with a plurality of vanes 40. Each vane 40 has an axle 42 rigidly affixed thereto. The axles 42 are inserted through corresponding second apertures 28 in the nozzle ring 20, which apertures 28 extend entirely through the nozzle ring from the first face to an opposite second face thereof. The axles 42 are inserted into the apertures 28 from the second face, and distal ends 43 of the axles extend slightly beyond the first face (see FIG. 6). Each first aperture 24 is located, circumferentially, between two of the second apertures 28. The first apertures 24 are located at a greater radius than the second apertures 28, relative to the axis of the nozzle ring 20.

Figure 5:
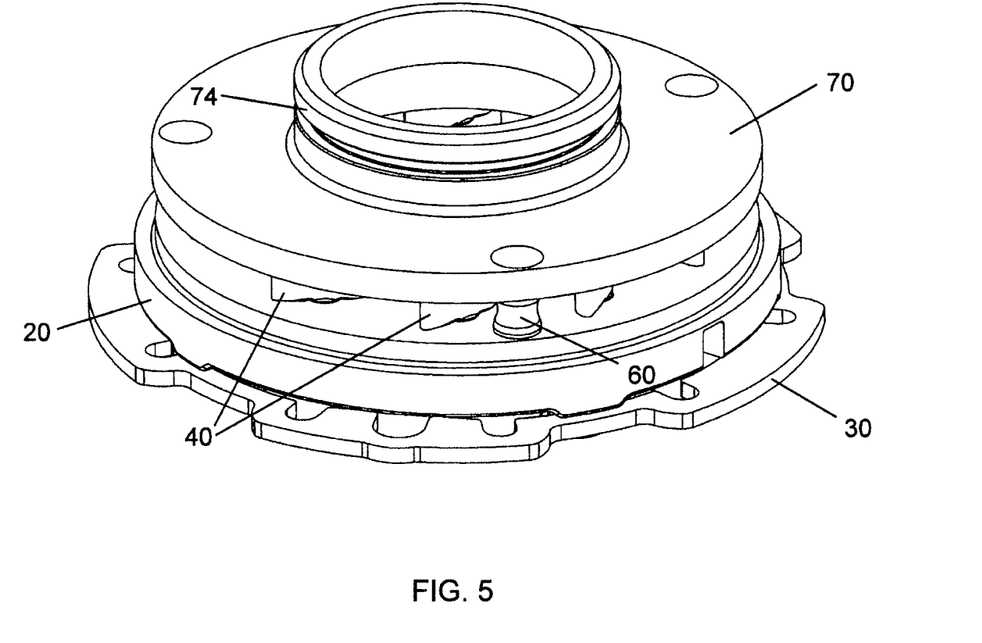
FIG. 5 is a perspective view of a third assembly including the second assembly of FIG. 3 and a turbine housing insert.

Also visible in FIGS. 3 and 4 are three spacers 60 rigidly affixed to the nozzle ring 20 and projecting axially from the second face of the nozzle ring for engagement with a turbine housing insert 70 (FIG. 5). The turbine housing insert 70 has three apertures for receiving end portions of the spacers 60. The spacers have shoulders or radial bosses that abut the second face of the nozzle ring 20 and the opposite face of the insert 70 so as to dictate the axial spacing between these faces. The spacers are rigidly affixed to the nozzle ring and insert, such as by orbital riveting or any other suitable process. The turbine housing insert 70 is configured with a tubular portion 74 to be inserted into the bore of a turbine housing in a turbocharger. The nozzle ring 20 and insert 70 cooperate to form a passage therebetween, and the variable vanes 40 are arranged in the passage and preferably extend in the axial direction fully across the passage so that fluid flowing through the passage is constrained to flow through the spaces between the vanes. FIG. 5 shows a third assembly comprising the second assembly of FIG. 4 assembled with the turbine housing insert 70.

Figure 6:
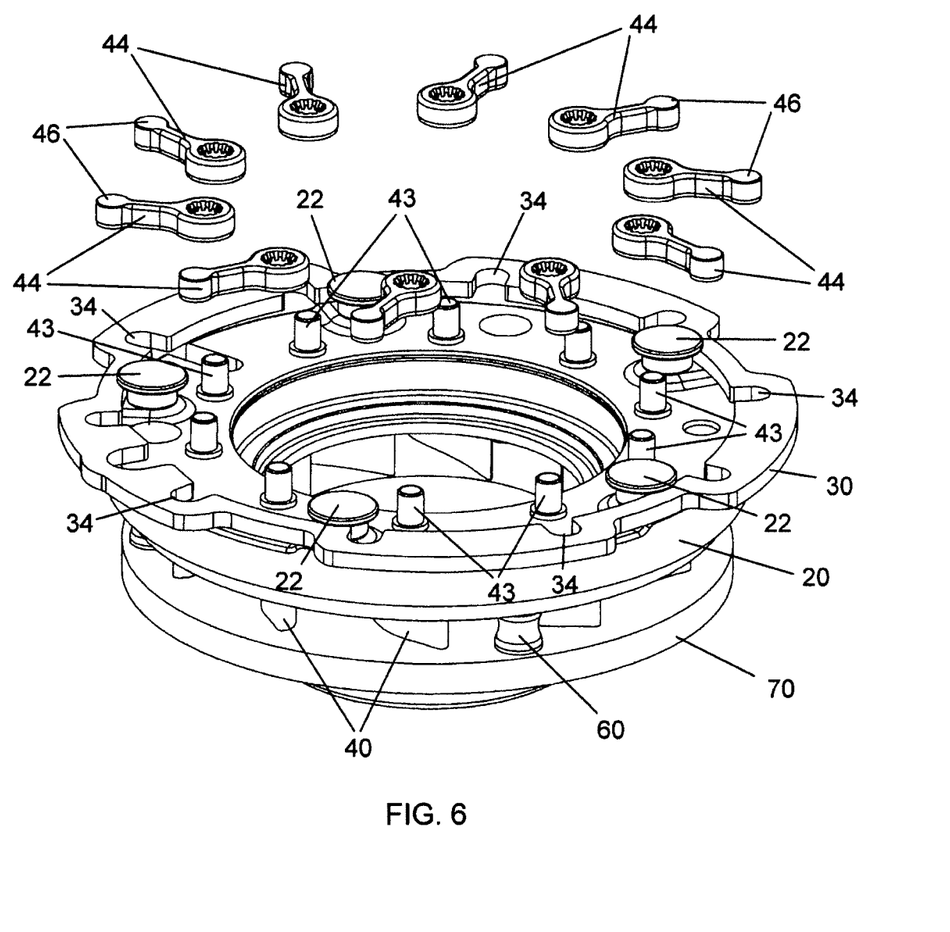
FIG. 6 is an exploded view of a fourth assembly that includes the third assembly of FIG. 5 (shown inverted relative to FIG. 5) together with a plurality of vane arms.
Figure 7:
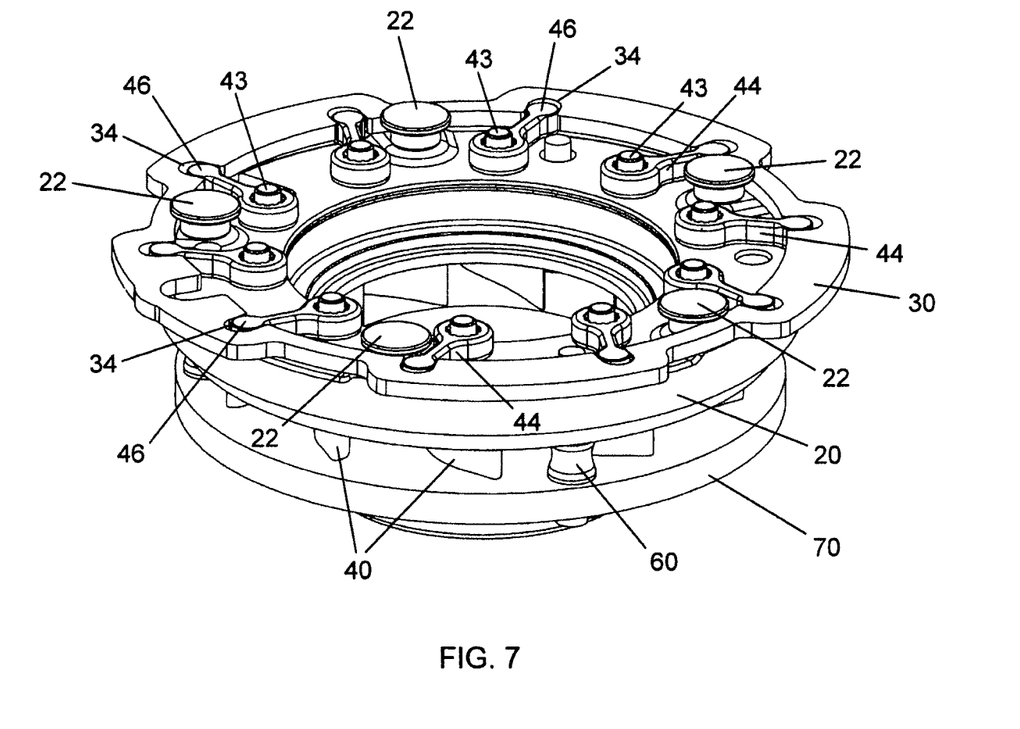
FIG. 7 is a perspective view of the fourth assembly of FIG. 6 in its final assembled condition.

With reference to FIG. 6, a fourth assembly is shown in exploded view, comprising the third assembly of FIG. 5 together with a plurality of vane arms 44. The setting angles of the vanes 40 are changed by rotating the vanes about the axes defined by the vane axles 42, whereby the vane axles rotate in their respective second apertures 28 in the nozzle ring 20. A vane arm 44 is engaged with the distal end 43 of each vane axle 42. Each vane arm has a free end 46 that is engaged in a recess 34 in the inner edge of the unison ring 30. The vanes 40 are positioned such that all of the vanes have the same setting angle, and then the vane arms are rigidly affixed to the distal ends 43 of the axles 42, such as by welding, or by a riveting process described further in connection with FIGS. 11-13. FIG. 7 shows the fourth assembly in its assembled condition. Rotation of the unison ring 30 about its central axis causes the vane arms 44 to pivot, thereby pivoting the vanes 40 in unison.

The entire variable-vane assembly of FIG. 7 forms a unit that is installable into the turbine housing bore. The turbine housing is then connected to a center housing of the turbocharger such that the variable-vane assembly is captured between the turbine and center housings.

In accordance with one embodiment of the present invention, therefore, the variable-vane assembly allows the assembly process to be eased and simplified and the manufacturing cost of the assembly to be reduced. In particular, the nozzle ring 20 can be formed with the bosses 21 integrally formed thereon, and the provision of the bosses 21 allows the guide pins 22 to have a simple structure that can be made without machining (e.g., by cold forging). More specifically, because the bosses 21 space the unison ring 30 away from the nozzle ring by the desired axial spacing, this function does not have to be performed by the guide pins 22. Thus, the guide pins need only a single shoulder 26, for restraining axial movement of the unison ring away from the nozzle ring. Regarding the nozzle ring 20, it can be made by hot forging the ring to near net shape, followed by cold forging to calibrate (finetune) the shape, wherein the bosses 21 are formed to their final shape during the forging process. Precision machining of the nozzle ring is required only on its inner diameter and on the face that is adjacent the vanes 40.

Figure 8A:
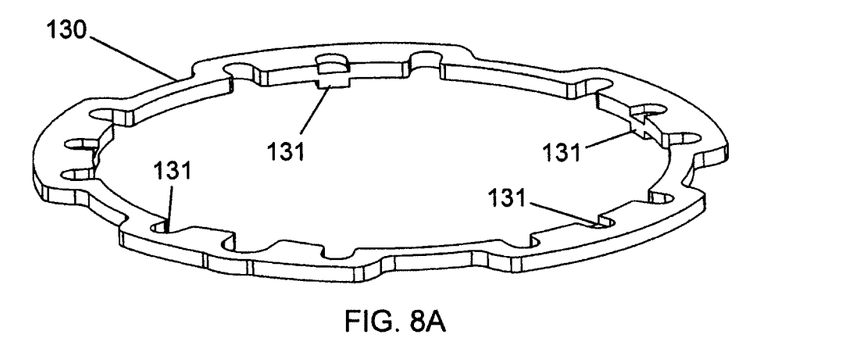
FIG. 8A is a perspective view of a unison ring for use in an alternative embodiment of the present invention.
Figure 8B:
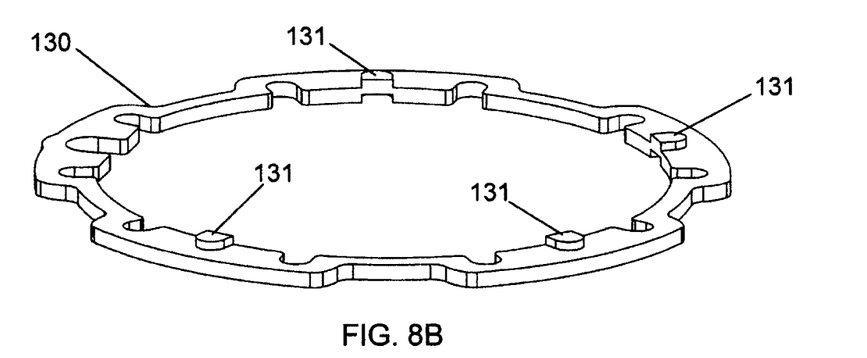
FIG. 8B is a view similar to FIG. 8A, with the unison ring inverted relative to FIG. 8A.

The embodiment described above employs bosses 21 (i.e., protrusions) on the nozzle ring 20 for spacing the unison ring 30 from the nozzle ring. In an alternative embodiment as shown in FIGS. 8A, 8B, 9, and 10, the protrusions can be formed on the unison ring. Thus, FIGS. 8A and 8B illustrate an alternative unison ring 130 that is generally similar to the previously described unison ring 30, except that it includes a plurality of protrusions 131 that extend from one of the substantially planar faces of the ring. The protrusions can be formed in any suitable fashion. One possibility is to form the unison ring by stamping, and to form the protrusions during the stamping process, although the embodiments of the invention employing the unison ring 130 are not limited to any particular manufacturing process for the ring. The protrusions 131 essentially serve the same function as the bosses 21 on the nozzle ring 20 in the previously described embodiment, namely, to axially space the unison ring 130 from the adjacent nozzle ring by a desired distance dictated by the height of the protrusions.

Figure 9:
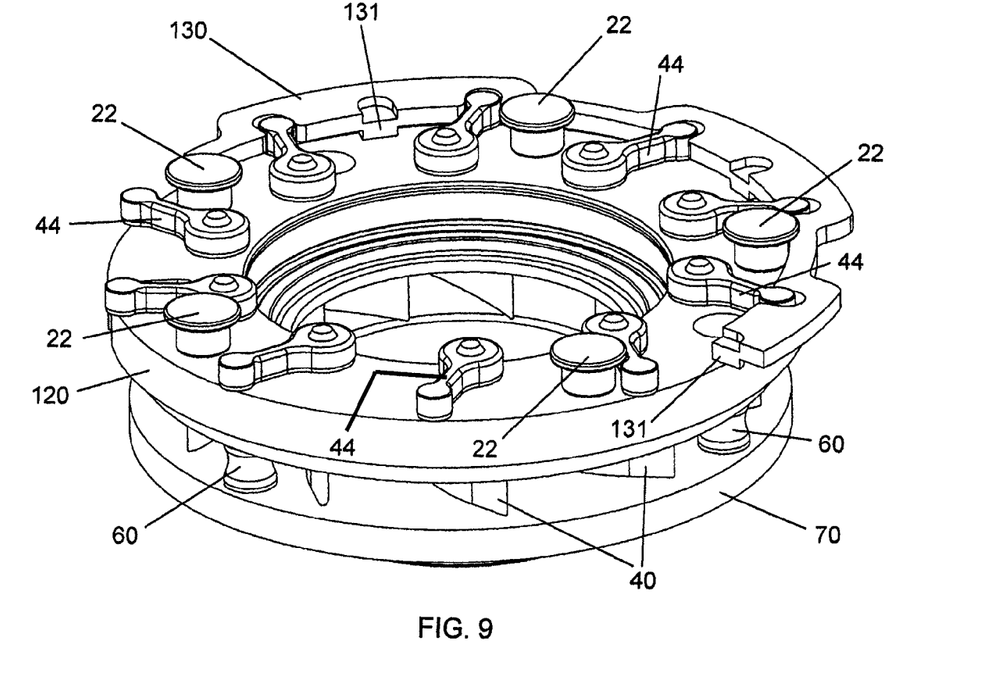
FIG. 9 is a perspective view of a variable-vane assembly using the unison ring of FIGS. 8A and 8B, showing the unison ring partially broken away for clarity of illustration
Figure 10:
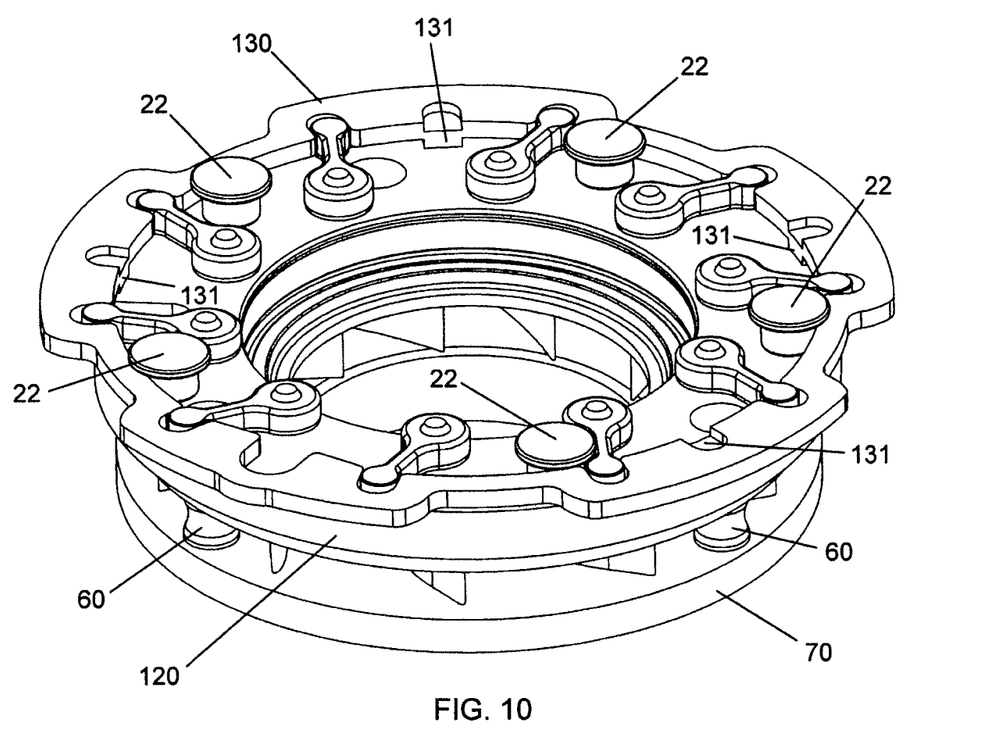
FIG. 10 is a perspective view of the variable-vane assembly of FIG. 9.

A variable-vane assembly in accordance with this embodiment of the invention is depicted in FIGS. 9 and 10, the unison ring 130 being partially broken away in FIG. 9 for clarity of illustration. The parts in FIGS. 9 and 10 bearing the same numbers as the previous embodiment have essentially the same structure and function as in the previous embodiment and hence their description is not repeated here. The nozzle ring 120 is substantially similar to the previously described nozzle ring 20, except that it lacks bosses because the protrusions 131 on the unison ring 130 perform the function of the bosses. In other respects, the variable-vane assembly is substantially like the previous embodiment.

As noted previously, the fixation of the vane arms 44 to the ends 43 of the vane axles 42 in some embodiments of the present invention can be performed by a process of orbital riveting rather than welding. One of the challenges in affixing the vane arms to the vane axles in any variable-vane assembly is ensuring that all vane/vane arm assemblies have the same orientation, in the rotational sense about the axis of the vane axle, between the vane and the vane arm. Additionally, it is always an objective to provide a sufficiently high breaking torque (i.e., the torque that must be exerted on the vane arm relative to the vane axle in order to break the axle/arm bond). While these objectives could be achieved by making the end of the vane axle in a non-round shape and making the hole in the vane arm correspondingly shaped, such an approach would not allow any flexibility in the relative orientation of the vane arm and axle. Thus, for example, if the assembler wanted to fine-tune the relative orientation in order to calibrate the vane setting angles, the non-round shapes of the axle and hole would not allow such fine tuning.

Figure 11:
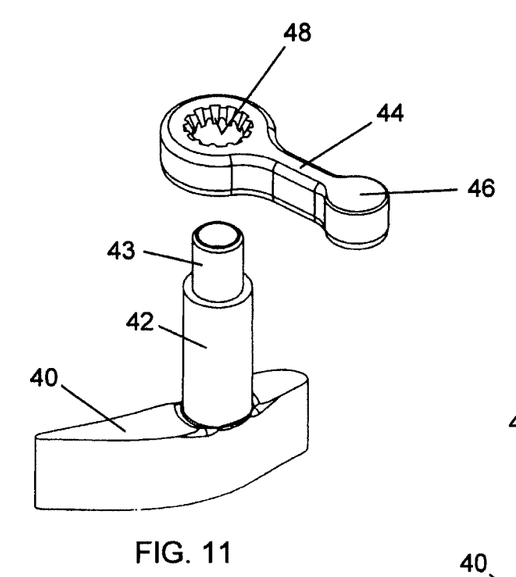
FIG. 11 is an exploded view of a vane and vane arm in accordance with one embodiment.
Figure 12:
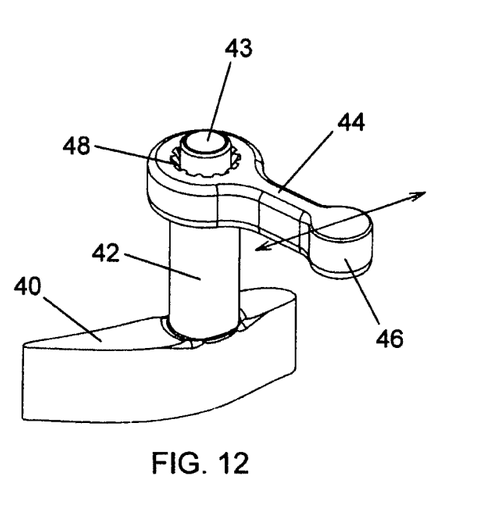
FIG. 12 is a view of the vane and vane arm of FIG. 11 in an assembled state prior to riveting.
Figure 13:
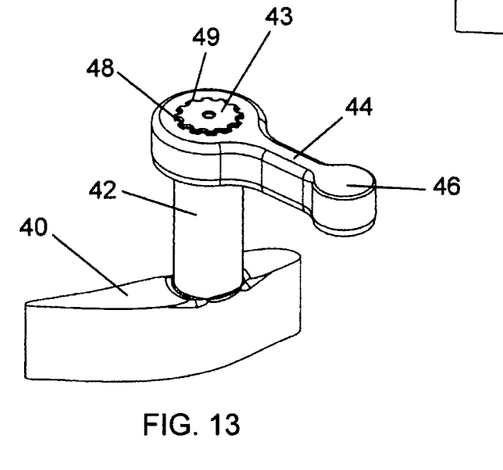
FIG. 13 is a view of the vane and vane arm after riveting.

In accordance with one embodiment of the invention, the objectives of high breaking torque and ability to fine-tune the vane arm orientation are achieved by a conical knurled riveted joint illustrated in FIGS. 11-13. The ends 43 of the vane axles 42 are generally circular cylindrical in shape. The hole in the vane arm 44 has a conical knurled portion 48 at the upper side of the arm (i.e., the side that will face away from the vane 40 after assembly). The knurled portion 48 defines a plurality of radially inwardly projecting teeth 49 spaced apart about the inner circumference of the hole. The smallest diameter collectively defined by the teeth is substantially equal to or very slightly larger than the outside diameter of the axle end 43. FIG. 12 illustrates that in a first step, the end 43 of the vane axle 42 is inserted through the hole in the vane arm 44. Because of the circular shape of the axle end 43, the vane arm 44 can be rotated relative to the axle 42 by any desired amount, and in particular can be adjusted by an amount less than the angular spacing between the teeth of the knurled portion 48, if such is required in order to fine-tune the relative orientation of the arm. As shown in FIG. 13, the axle end 43 is then upset or deformed by a suitable riveting tool such that the material of the end 43 is caused to generally conform to the conical shape of the knurled portion 48 and is caused to intrude into the spaces between the teeth of the knurled portion 48, thereby achieving an interlocking effect (both rotationally and along the axis of the axle) between the arm and the axle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A variable-vane assembly for a turbocharger, comprising:
    a nozzle ring having opposite first and second faces and having a plurality of circumferentially spaced-apart first apertures each extending axially into the first face and a plurality of circumferentially spaced-apart second apertures each of which extends axially from the first face to the second face;
    a plurality of vanes having respective axles received into the second apertures from the second face of the nozzle ring and being rotatable in the second apertures such that the vanes are rotatable about respective axes defined by the axles, a distal end of each axle projecting out from the respective second aperture beyond the first face;
    a plurality of vane arms respectively affixed rigidly to the distal ends of the axles, each vane arm having a free end;
    a unison ring having a radially inner edge defining a plurality of recesses therein that respectively receive the free ends of the vane arms, the unison ring being positioned coaxially with the nozzle ring with a face of the unison ring opposing the first face of the nozzle ring, the unison ring being rotatable about an axis of the nozzle ring so as to pivot the vane arms, thereby pivoting the vanes in unison;
    protrusions integrally formed on the nozzle ring and extending from the nozzle ring and contacting the unison ring, so as to axially space the first face of the nozzle ring from the opposing face of the unison ring by a first axial distance; and
    a plurality of guide pins located radially inward of the radially inner edge of the unison ring, the guide pins each being inserted into a respective one of the first apertures in the nozzle ring and being rigidly affixed therein such that the guide pins are non-rotatably secured to the nozzle ring with a guide portion of each guide pin projecting axially from the first face of the nozzle ring, the guide portion of each guide pin having a shank and defining a shoulder axially spaced from the first face of the nozzle ring by a second axial distance greater than the first axial distance, the shoulders radially overlapping the radially inner edge of the unison ring, whereby the protrusions and the shoulders cooperate to constrain axial movement of the unison ring and the shanks constrain radial movement of the unison ring.

2. The variable-vane assembly of claim 1, wherein the protrusions comprise bosses, each boss being adjacent a respective one of the first apertures.

3. The variable-vane assembly of claim 2, wherein each boss surrounds the respective first aperture.

4. The variable-vane assembly of claim 1, wherein each of the guide pins includes an end portion that is press-fit into the respective first aperture in the nozzle ring.

5. The variable-vane assembly of claim 4, wherein the shank of each guide pin has a greater diameter than the end portion.

6. The variable-vane assembly of claim 1, wherein each first aperture is located, circumferentially, between two of the second apertures.

7. The variable-vane assembly of claim 6, wherein the first apertures are located at a greater radius than the second apertures, relative to the axis of the nozzle ring.

8. The variable-vane assembly of claim 1, wherein the vane arms are affixed to the distal ends of the axles by riveted joints.

9. The variable-vane assembly of claim 8, wherein each vane arm has a hole that receives the distal end of the associated axle, the hole having a conical knurled portion at an upper side of the hole facing away from the associated vane, and the distal end of the axle is upset to generally conform in shape to that of the conical knurled portion so as to affix the vane arm to the axle.

10. A variable-vane assembly for a turbocharger, comprising:
    a nozzle ring having opposite first and second faces and having a plurality of circumferentially spaced-apart apertures each of which extends axially from the first face to the second face;
    a plurality of vanes having respective axles received into the apertures from the second face of the nozzle ring and being rotatable in the apertures such that the vanes are rotatable about respective axes defined by the axles, a distal end of each axle projecting out from the respective aperture beyond the first face;
    a plurality of vane arms respectively affixed rigidly to the distal ends of the axles, each vane arm having a free end; and
    a unison ring defining a plurality of recesses therein that respectively receive the free ends of the vane arms, the unison ring being positioned coaxially with the nozzle ring with a face of the unison ring opposing the first face of the nozzle ring, the unison ring being rotatable about an axis of the nozzle ring so as to pivot the vane arms, thereby pivoting the vanes in unison;
    protrusions integrally formed on the nozzle ring and extending from the nozzle ring and contacting the unison ring, so as to axially space the first face of the nozzle ring from the opposing face of the unison ring by a first axial distance;
    a plurality of guide pins located radially inward of a radially inner edge of the unison ring, the guide pins each being inserted into a respective opening in the nozzle ring and being rigidly affixed therein such that the guide pins are non-rotatably secured to the nozzle ring with a guide portion of each guide pin projecting axially from the first face of the nozzle ring, the guide portion of each guide pin having a shank and defining a shoulder axially spaced from the first face of the nozzle ring by a second axial distance greater than the first axial distance, the shoulders radially overlapping the radially inner edge of the unison ring, whereby the protrusions and the shoulders cooperate to constrain axial movement of the unison ring and the shanks constrain radial movement of the unison ring; and wherein the vane arms are affixed to the distal ends of the axles by riveted joints, each vane arm having a hole that receives the distal end of the associated axle, the hole having a conical knurled portion at an upper side of the hole facing away from the associated vane, and the distal end of the axle being upset to generally conform in shape to that of the conical knurled portion so as to affix the vane arm to the axle.

11. A method for assembling a variable-vane assembly for a turbocharger, comprising the steps of:

providing a nozzle ring having opposite first and second faces, having a plurality of circumferentially spaced-apart first apertures each extending axially into the first face and a plurality of circumferentially spaced-apart second apertures each of which extends axially from the first face to the second face;

providing a unison ring having a radially inner edge defining a plurality of recesses therein, and positioning the unison ring adjacent the first face of the nozzle ring, substantially coaxial with the nozzle ring;

providing protrusions integrally formed on the nozzle ring and extending from the nozzle ring and contacting the unison ring, so as to axially space the first face of the nozzle ring from the opposing face of the unison ring by a first axial distance;

positioning a plurality of guide pins radially inward of the radially inner edge of the unison ring, and inserting end portions of the guide pins respectively into the first apertures in the nozzle ring and rigidly affixing said end portions therein such that the guide pins are non-rotatably secured to the nozzle ring with a guide portion of each guide pin projecting axially from the first face of the nozzle ring, the guide portion of each guide pin having a shank and defining a shoulder axially spaced from the first face of the nozzle ring, the shoulders radially overlapping the radially inner edge of the unison ring, whereby the protrusions and the shoulders of the guide pins cooperate to constrain axial movement of the unison ring and the shanks constrain radial movement of the unison ring;

providing a plurality of vanes having respective axles, and inserting the axles respectively into the second apertures from the second face of the nozzle ring such that a distal end of each axle projects out from the respective second aperture beyond the first face;

providing a plurality of vane arms, and rigidly affixing the vane arms respectively to the distal ends of the axles, each vane arm having a free end; and engaging the free ends of the vane arms respectively in the recesses defined in the inner edge of the unison ring, whereby the unison ring is rotatable about an axis of the nozzle ring so as to pivot the vane arms, thereby pivoting the vanes in unison.

12. The method of claim 11, wherein the step of rigidly affixing the vane arms to the distal ends of the axles comprises a riveting process.

13. The method of claim 12, wherein each vane arm is provided to have a hole for receiving the distal end of one of the axles, and the hole is provided to have a conical knurled portion at an upper side of the hole facing away from the associated vane, and the affixing step comprises upsetting the distal end of the axle to generally conform in shape to that of the conical knurled portion so as to affix the vane arm to the axle.

\* \* \* \* \*